United States Patent [19]

Rusche

[11] Patent Number: 4,948,957

[45] Date of Patent: Aug. 14, 1990

[54] METHOD FOR TRAINING INFRARED IMAGER USERS

[75] Inventor: Gerald A. Rusche, Fairfax City, Va.

[73] Assignee: The United States of America as represented by the Secretary of the Army, Washington, D.C.

[21] Appl. No.: 331,194

[22] Filed: Mar. 31, 1989

[51] Int. Cl.$^5$ ............... G01M 11/00; G03B 21/00; G09B 14/00
[52] U.S. Cl. ................... 250/330; 250/504 R; 434/11
[58] Field of Search ............ 250/330, 495.1, 493.1, 250/504 R; 434/44, 11

[56] References Cited

U.S. PATENT DOCUMENTS

| | | | |
|---|---|---|---|
| 4,337,044 | 6/1982 | Palmer | 434/11 |
| 4,512,745 | 4/1985 | Mohon et al. | 434/44 |
| 4,639,603 | 1/1987 | Pistor | 250/504 R |

Primary Examiner—Janice A. Howell
Assistant Examiner—Richard Hanig
Attorney, Agent, or Firm—Milton W. Lee; Aubrey J. Dunn; Anthony T. Lane

[57] ABSTRACT

The method includes the steps of making a video recording of an infrared scene, of producing an infrared image from the recording and projecting it onto a screen, and of converting the projected image into a visible image at a user's infrared imager.

4 Claims, 1 Drawing Sheet

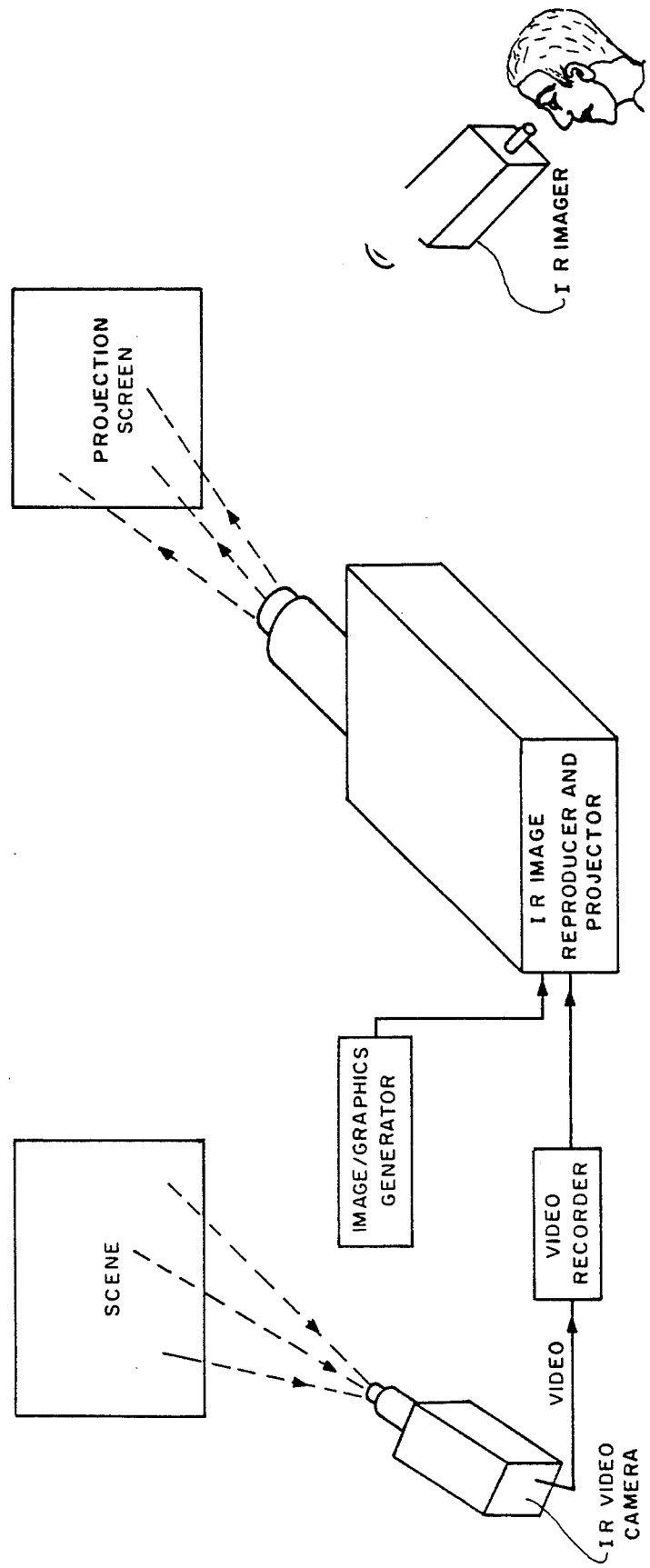

METHOD FOR TRAINING INFRARED IMAGER USERS

The invention described herein may be manufactured, used, and licensed by the U.S. Government for governmental purposes without the payment of any royalties thereon.

BACKGROUND OF INVENTION

This invention is in the field of optical training simulators, and is particularly concerned with simulators for training operators of infrared imaging devices such as night vision goggles (NVG). Of late, night vision systems applications in military aircraft have sharply increased. Flight crews in both rotary-and fixed-wing aircraft use NVG for navigation and target detection. While NVG are essential to night operations, flying with them is quite different from flying with the unaided eye. It is difficult to provide sufficient training using NVG in an aircraft; this is not only for reasons of cost, but also because some of the problems encountered are dependent on celestial and atmospheric conditions. Moreover, it is not always possible to schedule training flights when the desired combination of conditions exists. Further, sometimes it is desirable to demonstrate conditions that are extremely difficult and/or unsafe in actual flight. A pilot can experience these conditions without risk in a simulator. Earlier NVG simulations used photographic imagery, in the form of either motion pictures or slides, projected through filters to simulate field imagery. This was a satisfactory approach for the time, and has been used up to the present. Difficulties arise, however, because this imagery is difficult to record, difficult to process, difficult to edit, and does not lend itself to manipulation to simulate various conditions. Video tape is easy to use, requires no processing, can be replayed in the field to verify that data is correct, is easily edited with the proper equipment, and is in a format that is readily accepted by computer image processing systems. Therefore, it has become the medium of choice, and will probably remain so until it is eventually replaced by digital video recording. The present invention is a method of training using a video system.

SUMMARY OF THE INVENTION

The invention is a method for training users of infrared imagers. A video recording or the like of an infrared scene is used as the input to an infrared image projector. The image is projected onto a screen and the user observes a visible image of the projected infrared image in his infrared imager. Several users are thus able to operate simultaneously their imagers in the usual manner.

BRIEF DESCRIPTION OF THE DRAWINGS

The single drawing FIGURE shows a pictoral/-schematic system capable of practicing the inventive method.

DESCRIPTION OF PREFERRED EMBODIMENT OF THE INVENTION

Turning now to the drawing, we see a system by which the invention may be practiced. This system includes an infrared video camera which provides a video output signal in response to infrared radiation from a scene. This scene may be a normally occurring outdoor scene with the usual objects of such a scene, or a staged scene, with infrared emitters in which one is interested. These emitters may include vehicles such as trucks and tanks, as well as personnel, buildings, etc. The video output of the camera is recorded by a video recorder of any desired type, such as laser or magnetic disc, magnetic tape, etc. Alternatively, a video recording may be produced in a digital image or graphics generator. Moreover, rather than using a video camera, one may use a movie camera with infrared film then transfer the film images to a video magnetic tape or the like. In any event, the video recording is used as an input to an infrared image reproducer and projector. The projector image is projected onto a projection screen and may be viewed by one or more infrared imagers operated by one or more trainees. Each imager converts the image on the screen into a visible image for its respective user. Obviously, the imager may take the form of a hand-held or tripod mounted device, or head or helmet-mounted goggles, or any of the normal infrared imagers. The trainees are free to move about with their imagers, and to operate them in the normal manner for viewing an infrared scene.

With the possible exception of the infrared image reproducer and projector, all of the items of the drawing are well-known and available in several forms. A regular movie screen may be used, but there are now available screens which are more efficient for infrared images. A video projector usable in this invention is shown in U.S. Pat. application Ser. No. 113,964 filed Oct. 29, 1987.

The training method of the invention is easily by the system described above. The method consists of the steps of: preparing an electronic representation (such as a video tape) of an infrared scene by any of the methods described above, producing an infrared image and projecting it onto a screen, and converting the projected infrared image (at each trainee's imager) into a visible observable by the trainee.

I claim:

1. A method for training a user of an infrared imager, including the steps of:
   preparing an electronic representation of an infrared scene;
   producing an infrared image from said representation;
   projecting said infrared image onto a screen; and
   converting, in said infrared imager, the infrared image on said screen into a visible image observable by said user.

2. The method as set forth in claim 1 wherein the step of preparing consists of recording a video signal of an infrared scene as said electronic representation.

3. The method as set forth in claim 1 wherein the step of preparing consists of the steps of:
   generating an electronic embodiment of an infrared scene; and
   recording said embodiment as said representation.

4. The method as set forth in claim 1 wherein the step of preparing includes the steps of:
   making an infrared movie of said infrared scene, and
   making a video signal recording of said movie.

* * * * *